United States Patent
XiaoPing

(10) Patent No.: US 8,436,824 B2
(45) Date of Patent: May 7, 2013

(54) TOOTHED SLIDER

(75) Inventor: Jiang XiaoPing, Shanghai (CN)

(73) Assignee: Cypress Semiconductor Corporation, San Jose, CA (US)

( * ) Notice: Subject to any disclaimer, the term of this patent is extended or adjusted under 35 U.S.C. 154(b) by 171 days.

(21) Appl. No.: 13/012,750

(22) Filed: Jan. 24, 2011

(65) Prior Publication Data

US 2012/0043141 A1 Feb. 23, 2012

Related U.S. Application Data

(63) Continuation of application No. 11/437,518, filed on May 18, 2006, now Pat. No. 7,876,309.

(51) Int. Cl.
*G06F 3/041* (2006.01)

(52) U.S. Cl.
USPC ...... 345/173; 345/174; 178/18.01; 178/20.04

(58) Field of Classification Search .......... 345/173–184; 178/18.01–20.04
See application file for complete search history.

(56) References Cited

U.S. PATENT DOCUMENTS

| | | | |
|---|---|---|---|
| 4,087,625 A | 5/1978 | Dym et al. | |
| 4,264,903 A | 4/1981 | Bigelow | |
| 4,622,437 A | 11/1986 | Bloom et al. | |
| 4,659,874 A | 4/1987 | Landmeier | |
| 4,680,430 A | 7/1987 | Yoshikawa et al. | |
| 4,705,919 A | 11/1987 | Dhawan | |
| 4,952,757 A | 8/1990 | Purcell et al. | |
| 4,999,462 A | 3/1991 | Purcell | |
| 5,305,017 A | 4/1994 | Gerpheide | |
| 5,856,937 A * | 1/1999 | Chu et al. | 365/51 |
| 5,869,790 A | 2/1999 | Shigetaka et al. | |
| 6,188,391 B1 | 2/2001 | Seely et al. | |
| 6,222,522 B1 | 4/2001 | Mathews et al. | |
| 6,297,811 B1 | 10/2001 | Kent | |
| 6,353,200 B1 | 3/2002 | Schwankhart | |
| 6,380,931 B1 | 4/2002 | Gillespie et al. | |
| 6,888,538 B2 | 5/2005 | Ely et al. | |
| 7,382,139 B2 | 6/2008 | Mackey | |
| 7,548,073 B2 * | 6/2009 | Mackey et al. | 324/660 |
| 7,663,607 B2 * | 2/2010 | Hotelling et al. | 345/173 |
| 2006/0097991 A1 | 5/2006 | Hotelling et al. | |
| 2007/0247443 A1 * | 10/2007 | Philipp | 345/173 |
| 2007/0257894 A1 * | 11/2007 | Philipp | 345/173 |

OTHER PUBLICATIONS

USPTO Notice of Allowance for U.S. Appl. No. 11/437,518 dated Feb. 23, 2011; 6 pages.
USPTO Non-Final Rejection for U.S. Appl. No. 11/437,518 dated Aug. 18, 2009; 10 pages.
USPTO Requirement Restriction for U.S. Appl. No. 11/437,518 dated Apr. 21, 2009; 6 pages.

(Continued)

*Primary Examiner* — Amare Mengistu
*Assistant Examiner* — Vinh Lam

(57) ABSTRACT

An example method includes measuring a capacitance variation of a first conductive element and a capacitance variation of a second conductive element. The example method includes calculating a centroid position through the measured capacitance variation of the first conductive element and the measured capacitance variation of the second conductive element. A conductive sub-element of the first conductive element may be interleaved with a conductive sub-element of the second conductive element. The conductive sub-element of the first conductive element and the conductive sub-element of the second conductive element may each have a varying width.

18 Claims, 9 Drawing Sheets

OTHER PUBLICATIONS

Hal Philipp, "Charge Transfer Sensing", Spread Spectrum Sensor Technology Blazes New Applications, 1997, 9 pages.

Chapweske, Adam, "The PS/2 Mouse Interface", PS/2 Mouse Interfacing, 2001, 11 pages.

"CY8C21x34 Data Sheet", Cypress Semiconductor Corporation, CSR User Module, CSR v1.0, Oct. 6, 2005, pp. 1-36.

USPTO Notice of Allowance for U.S. Appl. No. 11/437,518 dated Sep. 17, 2010; 4 pages.

* cited by examiner

TOOTHED SLIDER

RELATED APPLICATIONS

This application claims priority to U.S. Non-Provisional application Ser. No. 11/437,518 filed May 18, 2006 which is incorporated herein by reference.

TECHNICAL FIELD

This invention relates generally to touch sensing devices, and in particular, to the structure of a touch sensing device.

BACKGROUND

Computing devices, such as notebook computers, personal data assistants (PDAs), and mobile handsets, have user interface devices, which are also known as human interface device (HID). One user interface device that has become more common is a touch-sensor pad. A basic notebook touch-sensor pad emulates the function of a personal computer (PC) mouse. A touch-sensor pad is typically embedded into a PC notebook for built-in portability. A touch-sensor pad replicates mouse x/y movement by using two defined axes which contain a collection of sensor elements that detect the position of a conductive object, such as finger. Mouse right/left button clicks can be replicated by two mechanical buttons, located in the vicinity of the touchpad, or by tapping commands on the touch-sensor pad itself. The touch-sensor pad provides a user interface device for performing such functions as positioning a cursor, or selecting an item on a display. These touch-sensor pads can include multi-dimensional sensor arrays. The sensor array may be one dimensional, detecting movement in one axis. The sensor array may also be two dimensional, detecting movements in two axes.

FIG. 1 illustrates an example of a conventional slider structure 100 connect to ten conductive traces 102. Each trace 102 may be connected between a conductive line and a ground. The conductive line is typically coupled to a sensing pin. The ground is typically coupled to a finger of person. By being in contact or in proximity on a particular portion of the slider structure 100, the capacitance between the conductive lines and ground varies and can be detected. By sensing the capacitance variation of each trace 102, the position of the changing capacitance can be pinpointed. For example, a stylus or a user's finger in proximity or in contact to the slider structure 100 generates signals 104 using the traces 102. A stylus or a user's finger in proximity or in contact to the slider structure 100 at trace number 4 may generate a capacitance variation differential of, for example, 5 units. Adjacent traces number 3 and number 5 may respectively generate a capacitance variation differential of, for example, 2 and 3 units. The detected position of the finger or stylus (i.e., centroid position) may be detected using a complex formula.

BRIEF DESCRIPTION OF THE DRAWINGS

The present invention is illustrated by way of example, and not by way of limitation, in the figures of the accompanying drawings.

DETAILED DESCRIPTION

In the following description, for purposes of explanation, numerous specific details are set forth in order to provide a thorough understanding of the present invention. It will be evident, however, to one skilled in the art that the present invention may be practiced without these specific details. In other instances, well-known circuits, structures, and techniques are not shown in detail or are shown in block diagram form in order to avoid unnecessarily obscuring an understanding of this description.

Reference in the description to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment. The term "coupled" as used herein may include both directly coupled and indirectly coupled through one or more intervening components.

A method and apparatus for detecting a user input is described. The apparatus includes a touch sensing device structure, in particular, a slider structure. Those of ordinary skills in the art will recognize that a slider may be a subset of a touchpad. In other words, the slider may be a one-dimensional touch sensing device. The slider may not be necessarily used to convey absolute positional information of a contacting object (such as to emulate a mouse in controlling cursor positioning on a display). The slider may rather be used to actuate one or more functions associated with sensing elements of the device.

Figure 2:
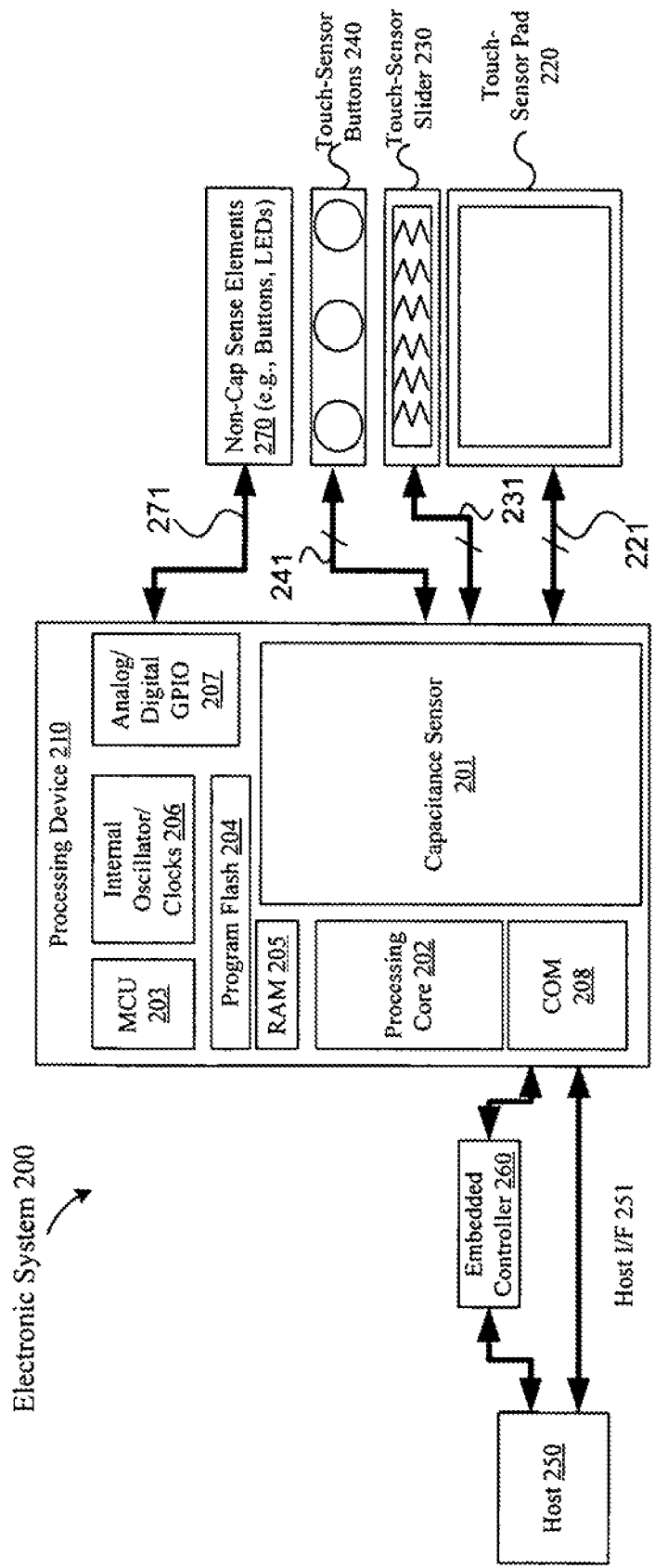
FIG. 2 illustrates a slider system in accordance with one embodiment.

FIG. 2 illustrates a block diagram of one embodiment of an electronic system having a processing device for recognizing a tap gesture. Electronic system 200 includes processing device 210, touch-sensor pad 220, touch-sensor slider 230, touch-sensor buttons 240, host processor 250, embedded controller 260, and non-capacitance sensor elements 270. The processing device 210 may include analog and/or digital general purpose input/output ("GPIO") ports 207. GPIO ports 207 may be programmable. GPIO ports 207 may be coupled to a Programmable Interconnect and Logic ("PIL"), which acts as an interconnection between GPIO ports 207 and a digital block array of the processing device 210 (not illustrated). The digital block array may be configured to implement a variety of digital logic circuits (e.g., DAC, digital filters, digital control systems, etc.) using, in one embodiment, configurable user modules ("UMs"). The digital block array may be coupled to a system bus. Processing device 210 may also include memory, such as random access memory (RAM) 205 and program flash 204. RAM 205 may be static RAM (SRAM), and program flash 204 may be a non-volatile storage, which may be used to store firmware (e.g., control algorithms executable by processing core 202 to implement operations described herein). Processing device 210 may also include a memory controller unit (MCU) 203 coupled to memory and the processing core 202.

The processing device 210 may also include an analog block array (not illustrated). The analog block array is also coupled to the system bus. Analog block array also may be configured to implement a variety of analog circuits (e.g., ADC, analog filters, etc.) using configurable UMs. The analog block array may also be coupled to the GPIO 207.

As illustrated, capacitance sensor 201 may be integrated into processing device 210. Capacitance sensor 201 may include analog I/O for coupling to an external component such as touch sensing devices (e.g. touch-sensor slider 230, touch-sensor pad 220, touch-sensor buttons 240, and/or other touch sensing devices). Capacitance sensor 201 and processing device 202 are described in more detail below.

It should be noted that the embodiments described herein are with respect to touch sensing devices that can be used in other capacitive sensing implementations. FIG. 2 illustrates touch sensing devices including, for example, a touch-slider 230, a touch-sensing pad 220, or a touch-sensor 240 (e.g., capacitance sensing button). Similarly, the operations described herein are not limited to notebook cursor operations, but can include other operations, such as lighting control (dimmer), volume control, graphic equalizer control, speed control, or other control operations requiring gradual adjustments. It should also be noted that these embodiments of capacitive sensing implementations may be used in conjunction with non-capacitive sensing elements, including but not limited to pick buttons, sliders (ex. display brightness and contrast), scroll-wheels, multi-media control (ex. volume, track advance, etc) handwriting recognition and numeric keypad operation.

In one embodiment, the electronic system 200 includes a touch-sensor slider 230 coupled to the processing device 210 via bus 231. Touch-sensor slider 230 may include a single-dimension sensor array. The single-dimension sensor array comprises a plurality of sensor elements, normally organized as rows, or alternatively, as columns. In another embodiment, the electronic system 200 includes a touch-sensor pad 220 coupled to the processing device 210 via bus 221. Touch-sensor pad 220 may include a multi-dimension sensor array. The multi-dimension sensor array comprises a plurality of sensor elements, organized as rows and columns. In another embodiment, the electronic system 200 includes a touch-sensor button 240 coupled to the processing device 210 via bus 241. Touch-sensor button 240 may include a single-dimension or multi-dimension sensor array. The single- or multi-dimension sensor array comprises a plurality of sensor elements. For a touch-sensor button, the plurality of sensor elements may be coupled together to detect a presence of a conductive object over the entire surface of the sensing device. Capacitance sensor elements may be used as non-contact switches. These switches, when protected by an insulating layer, offer resistance to severe environments.

The electronic system 200 may include any combination of one or more of the touch-sensor slider 230, touch-sensor pad 220; and/or touch-sensor button 240. In another embodiment, the electronic system 200 may also include non-capacitance sensor elements 270 coupled to the processing device 210 via bus 271. The non-capacitance sensor elements 270 may include buttons, light emitting diodes (LEDs), and other user interface devices, such as a mouse, a keyboard, or other functional keys that do not require capacitance sensing. In one embodiment, buses 271, 241, 231, and 221 may be a single bus. Alternatively, these buses may be configured into any combination of one or more separate buses.

The processing device may also provide value-add functionality such as keyboard control integration, LEDs, battery charger and general purpose I/O, as illustrated as non-capacitance sensor elements 270. Non-capacitance sensor elements 270 are coupled to the GPIO 207.

Processing device 210 may include internal oscillator/clocks 206, and communication block 208. The oscillator/clocks block 206 provides clock signals to one or more of the components of processing device 210. Communication block 208 may be used to communicate with an external component, such as a host processor 250, via host interface (I/F) line 251. Alternatively, processing block 210 may also be coupled to embedded controller 260 to communicate with the external components, such as host 250. Interfacing to the host 250 can be through various methods. In one exemplary embodiment, interfacing with the host 250 may be done using a standard PS/2 interface to connect to an embedded controller 260, which in turn sends data to the host 250 via low pin count (LPC) interface. In some instances, it may be beneficial for the processing device 210 to do both touch-sensor structures and keyboard control operations, thereby freeing up the embedded controller 260 for other housekeeping functions. In another exemplary embodiment, interfacing may be done using a universal serial bus (USB) interface directly coupled to the host 250 via host interface line 251. Alternatively, the processing device 210 may communicate to external components, such as the host 250 using industry standard interfaces, such as USB, PS/2, inter-integrated circuit (I2C) bus, or system packet interface (SPI). The embedded controller 260 and/or embedded controller 260 may be coupled to the processing device 210 with a ribbon or flex cable from an assembly, which houses the touch-sensor slider 230 and the processing device 210.

In one embodiment, the processing device 210 is configured to communicate with the embedded controller 260 or the host 250 to send or receive data. The data may be a command or alternatively a signal. In other words, the processing device 210 may operate to communicate data (e.g., commands or signals) using hardware, software, and/or firmware, and the data may be communicated directly to the processing device of the host 250, such as a host processor, or alternatively, may be communicated to the host 250 via drivers of the host 250, such as OS drivers, or other non-OS drivers. It should also be noted that the host 250 may directly communicate with the processing device 210 via host interface 251.

In one embodiment, the data sent to the host 250 from the processing device 210 includes tap, double-tap, scroll-left, and scroll-right. Alternatively, other user interface device commands may be communicated to the host 250 from the processing device 210. These commands may be based on gestures occurring on the sensing device that are recognized by the processing device, such as tap and scroll gestures. Alternatively, other commands may be recognized. Similarly, signals may be sent that indicate the recognition of these operations.

In particular, a tap gesture, for example, may be when the finger (e.g., conductive object) is on the sensing device for less than a threshold time. If the time the finger is placed on the touch sensor slider is greater than the threshold time it may be considered to be a movement of along the one-dimensional axes. Scroll-left, and scroll-right may be detected when the one-dimensional position of the conductive object is within a pre-defined area (for example, such as extreme right and extreme left), and movement of the conductive object along the touch-sending slider is detected.

Processing device 210 may reside on a common carrier substrate such as, for example, an integrated circuit (IC) die substrate, a multi-chip module substrate, or the like. Alternatively, the components of processing device 210 may be one or more separate integrated circuits and/or discrete components. In one exemplary embodiment, processing device 210 may be a Programmable System on a Chip (PSoC™) processing device, manufactured by Cypress Semiconductor Corporation, San Jose, Calif. Alternatively, processing device 210 may be other one or more processing devices known by those of ordinary skill in the art, such as a microprocessor or central processing unit, a controller, special-purpose processor, digital signal processor (DSP), an application specific integrated circuit (ASIC), a field programmable gate array (FPGA), or the like. In an alternative embodiment, for example, the processing device may be a network processor having multiple processors including a core unit and multiple micro-engines. Additionally, the processing device may include any combination of general-purpose processing device(s) and special-purpose processing device(s).

Capacitance sensor 201 may be integrated into the IC of the processing device 210, or alternatively, in a separate IC. Alternatively, descriptions of capacitance sensor 201 may be generated and compiled for incorporation into other integrated circuits. For example, behavioral level code describing capacitance sensor 201, or portions thereof, may be generated using a hardware descriptive language, such as VHDL or Verilog, and stored to a machine-accessible medium (e.g., CD-ROM, hard disk, floppy disk, etc.). Furthermore, the behavioral level code can be compiled into register transfer level ("RTL") code, a netlist, or even a circuit layout and stored to a machine-accessible medium. The behavioral level code, the RTL code, the netlist, and the circuit layout all represent various levels of abstraction to describe capacitance sensor 201.

It should be noted that the components of electronic system 200 may include all the components described above. Alternatively, electronic system 200 may include only some of the components described above.

In one embodiment, electronic system 200 may be used in a notebook computer. Alternatively, the electronic device may be used in other applications, such as a mobile handset, a personal data assistant (PDA), a keyboard, a television, a remote control, a monitor, a handheld multi-media device, a handheld video player, a handheld gaming device, or a control panel.

In one embodiment, capacitance sensor 201 may be a capacitive switch relaxation oscillator (CSR). The CSR may have an array of capacitive touch switches using a current-programmable relaxation oscillator, an analog multiplexer, digital counting functions, and high-level software routines to compensate for environmental and physical switch variations. The switch array may include combinations of independent switches, sliding switches (e.g., touch-sensor slider), and touch-sensor pads implemented as a pair of orthogonal sliding switches. The CSR may include physical, electrical, and software components. The physical component may include the physical switch itself, typically a pattern constructed on a printed circuit board (PCB) with an insulating cover, a flexible membrane, or a transparent overlay. The electrical component may include an oscillator or other means to convert a changed capacitance into a measured signal. The electrical component may also include a counter or timer to measure the oscillator output. The software component may include detection and compensation software algorithms to convert the count value into a switch detection decision. For example, in the case of slide switches, a calculation for finding position of the conductive object to greater resolution than the physical pitch of the switches may be used.

It should be noted that there are various known methods for measuring capacitance. Although the embodiments described herein are described using a relaxation oscillator, the present embodiments are not limited to using relaxation oscillators, but may include other methods, such as current versus voltage phase shift measurement, resistor-capacitor charge timing, capacitive bridge divider or, charge transfer.

The current versus voltage phase shift measurement may include driving the capacitance through a fixed-value resistor to yield voltage and current waveforms that are out of phase by a predictable amount. The drive frequency can be adjusted to keep the phase measurement in a readily measured range. The resistor-capacitor charge timing may include charging the capacitor through a fixed resistor and measuring timing on the voltage ramp. Small capacitor values may require very large resistors for reasonable timing. The capacitive bridge divider may include driving the capacitor under test through a fixed reference capacitor. The reference capacitor and the capacitor under test form a voltage divider. The voltage signal is recovered with a synchronous demodulator, which may be done in the processing device 210. The charge transfer may be conceptually similar to an R-C charging circuit. In this method, $C_P$ is the capacitance being sensed. $C_{SUM}$ is the summing capacitor, into which charge is transferred on successive cycles. At the start of the measurement cycle, the voltage on $C_{SUM}$ is reset. The voltage on $C_{SUM}$ increases exponentially (and only slightly) with each clock cycle. The time for this voltage to reach a specific threshold is measured with a counter. Additional details regarding these alternative embodiments have not been included so as to not obscure the present embodiments, and because these alternative embodiments for measuring capacitance are known by those of ordinary skill in the art.

Figure 3A:
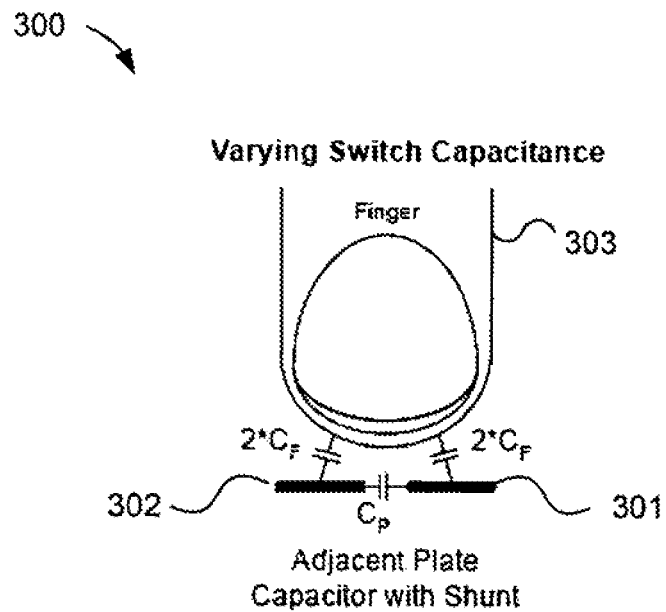
FIG. 3A illustrates a varying switch capacitance.
Figure 3B:
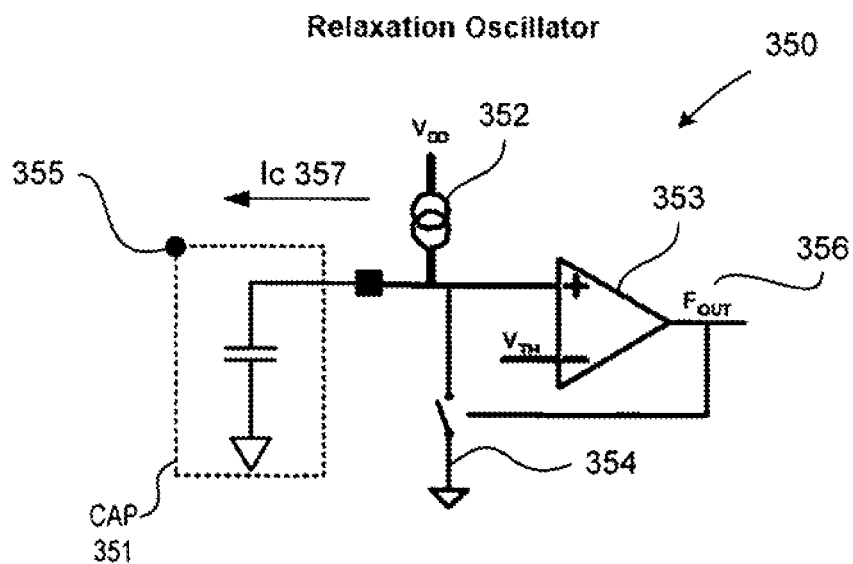
FIG. 3B illustrates one embodiment of a relaxation oscillator.

FIG. 3A illustrates a varying switch capacitance. In its basic form, a capacitive switch 300 is a pair of adjacent plates 301 and 302. There is a small edge-to-edge capacitance Cp, but the intent of switch layout is to minimize the base capacitance Cp between these plates. When a conductive object 303 (e.g., finger) is placed in proximity to the two plate 301 and 302, there is a capacitance 2*Cf between one electrode 301 and the conductive object 303 and a similar capacitance 2*Cf between the conductive object 303 and the other electrode 302. The capacitance between one electrode 301 and the conductive object 303 and back to the other electrode 302 adds in parallel to the base capacitance Cp between the plates 301 and 302, resulting in a change of capacitance Cf. Capacitive switch 300 may be used in a capacitance switch array. The capacitance switch array is a set of capacitors where one side of each is grounded. Thus, the active capacitor (as represented in FIG. 3B as capacitor 351) has only one accessible side. The presence of the conductive object 303 increases the capacitance (Cp+Cf) of the switch 300 to ground. Determining switch activation is then a matter of measuring change in the capacitance (Cf). Switch 300 is also known as a grounded variable capacitor. In one exemplary embodiment, Cf may range from approximately 10-30 picofarads (pF). Alternatively, other ranges may be used.

The conductive object in this case is a finger, alternatively, this technique may be applied to any conductive object, for example, a conductive door switch, position sensor, or conductive pen in a stylus tracking system.

FIG. 3B illustrates one embodiment of a relaxation oscillator. The relaxation oscillator 350 is formed by the capacitance to be measured on capacitor 351, a charging current source 352, a comparator 353, and a reset switch 354. It should be noted that capacitor 351 is representative of the capacitance measured on a sensor element of a sensor array. The relaxation oscillator is coupled to drive a charging current (Ic) 357 in a single direction onto a device under test ("DUT") capacitor, capacitor 351. As the charging current piles charge onto the capacitor 351, the voltage across the capacitor increases with time as a function of Ic 357 and its capacitance C. Equation (1) describes the relation between current, capacitance, voltage and time for a charging capacitor.

$$CdV = I_c dt \quad (1)$$

The relaxation oscillator begins by charging the capacitor 351 from a ground potential or zero voltage and continues to pile charge on the capacitor 351 at a fixed charging current Ic 357 until the voltage across the capacitor 351 at node 355 reaches a reference voltage or threshold voltage, $V_{TH}$ 355. At $V_{TH}$ 355, the relaxation oscillator allows the accumulated charge at node 355 to discharge (e.g., the capacitor 351 to "relax" back to the ground potential) and then the process repeats itself. In particular, the output of comparator 353 asserts a clock signal $F_{OUT}$ 356 (e.g., $F_{OUT}$ 356 goes high), which enables the reset switch 354. This resets the voltage on the capacitor at node 355 to ground and the charge cycle starts again. The relaxation oscillator outputs a relaxation oscillator clock signal ($F_{OUT}$ 356) having a frequency ($f_{RO}$) dependent upon capacitance C of the capacitor 351 and charging current Ic 357.

The comparator trip time of the comparator 353 and reset switch 354 add a fixed delay. The output of the comparator 353 is synchronized with a reference system clock to guarantee that the comparator reset time is long enough to completely reset the charging voltage on capacitor 355. This sets a practical upper limit to the operating frequency. For example, if capacitance C of the capacitor 351 changes, then $f_{RO}$ will change proportionally according to Equation (1). By comparing $f_{RO}$ of $F_{OUT}$ 356 against the frequency ($f_{REF}$) of a known reference system clock signal (REF CLK), the change in capacitance $\Delta C$ can be measured. Accordingly, equations (2) and (3) below describe that a change in frequency between $F_{OUT}$ 356 and REF CLK is proportional to a change in capacitance of the capacitor 351.

$$\Delta C \propto \Delta f, \text{ where} \quad (2)$$

$$\Delta f = f_{RO} - f_{REF}. \quad (3)$$

In one embodiment, a frequency comparator may be coupled to receive relaxation oscillator clock signal ($F_{OUT}$ 356) and REF CLK, compare their frequencies $f_{RO}$ and $f_{REF}$, respectively, and output a signal indicative of the difference $\Delta f$ between these frequencies. By monitoring $\Delta f$ one can determine whether the capacitance of the capacitor 351 has changed.

In one exemplary embodiment, the relaxation oscillator 350 may be built using a 555 timer to implement the comparator 353 and reset switch 354. Alternatively, the relaxation oscillator 350 may be built using other circuiting. Relaxation oscillators are known in by those of ordinary skill in the art, and accordingly, additional details regarding their operation have not been included so as to not obscure the present embodiments.

Figure 4:
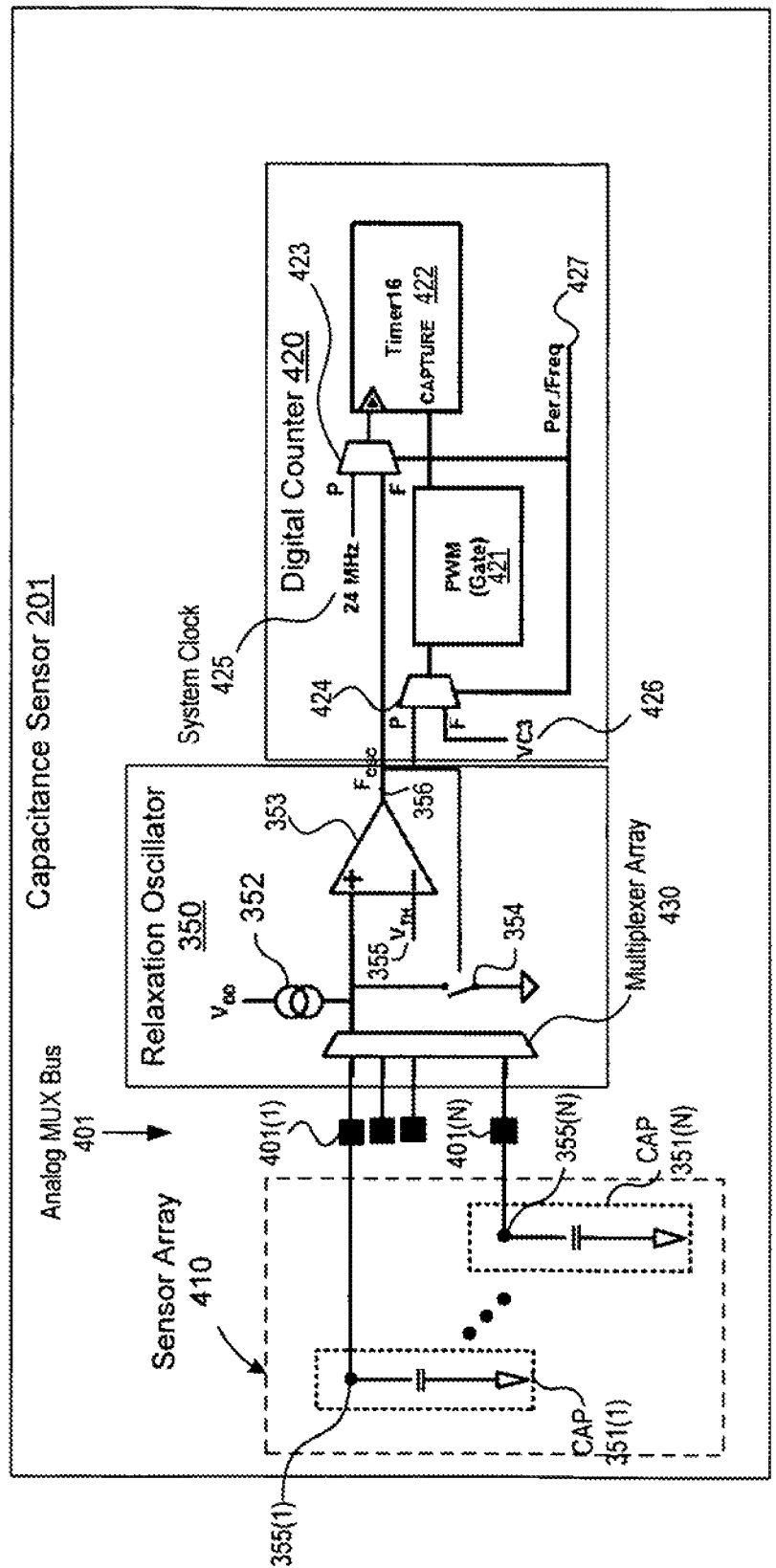
FIG. 4 illustrates a block diagram of one embodiment of a capacitance sensor including a relaxation oscillator and digital counter.

FIG. 4 illustrates a block diagram of one embodiment of a capacitance sensor including a relaxation oscillator and digital counter. Capacitance sensor 201 of FIG. 4 includes a sensor array 410 (also known as a switch array), relaxation oscillator 350, and a digital counter 420. Sensor array 410 includes a plurality of sensor elements 355(1)-355(N), where N is a positive integer value that represents the number of rows (or alternatively columns) of the sensor array 410. Each sensor element is represented as a capacitor, as previously described with respect to FIG. 3B. The sensor array 410 is coupled to relaxation oscillator 350 via an analog bus 401 having a plurality of pins 401(1)-401(N). In one embodiment, the sensor array 410 may be a single-dimension sensor array including the sensor elements 355(1)-355(N), where N is a positive integer value that represents the number of sensor elements of the single-dimension sensor array. The single-dimension sensor array 410 provides output data to the analog bus 401 of the processing device 210 (e.g., via lines 231).

Relaxation oscillator 350 of FIG. 4 includes all the components described with respect to FIG. 3B, and a selection circuit 430. The selection circuit 430 is coupled to the plurality of sensor elements 355(1)-355(N), the reset switch 354, the current source 352, and the comparator 353. Selection circuit 430 may be used to allow the relaxation oscillator 350 to measure capacitance on multiple sensor elements (e.g., rows or columns). The selection circuit 430 may be configured to sequentially select a sensor element of the plurality of sensor elements to provide the charge current and to measure the capacitance of each sensor element. In one exemplary embodiment, the selection circuit 430 is a multiplexer array of the relaxation oscillator 350. Alternatively, selection circuit may be other circuitry outside the relaxation oscillator 350, or even outside the capacitance sensor 201 to select the sensor element to be measured. Capacitance sensor 201 may include one relaxation oscillator and digital counter for the plurality of sensor elements of the sensor array. Alternatively, capacitance sensor 201 may include multiple relaxation oscillators and digital counters to measure capacitance on the plurality of sensor elements of the sensor array. The multiplexer array may also be used to ground the sensor elements that are not being measured. This may be done in conjunction with a dedicated pin in the GP10 port 207.

In another embodiment, the capacitance sensor 201 may be configured to simultaneously scan the sensor elements, as opposed to being configured to sequentially scan the sensor elements as described above. For example, the sensing device may include a sensor array having a row of sensing elements. The sensing elements of the row may be scanned simultaneously. Alternatively, other methods for scanning known by those of ordinary skill in the art may be used to scan the sensing device.

Digital counter 420 is coupled to the output of the relaxation oscillator 350. Digital counter 420 receives the relaxation oscillator output signal 356 ($F_{OUT}$). Digital counter 420 is configured to count at least one of a frequency or a period of the relaxation oscillator output received from the relaxation oscillator.

As previously described with respect to the relaxation oscillator 350, when a finger or conductive object is placed on the switch, the capacitance increases from Cp to Cp+Cf so the relaxation oscillator output signal 356 ($F_{OUT}$) decreases. The relaxation oscillator output signal 356 ($F_{OUT}$) is fed to the digital counter 420 for measurement. There are two methods for counting the relaxation oscillator output signal 356, frequency measurement and period measurement. In one embodiment, the digital counter 420 may include two multiplexers 423 and 424. Multiplexers 423 and 424 are configured to select the inputs for the PWM 421 and the timer 422 for the two measurement methods, frequency and period measurement methods. Alternatively, other selection circuits may be used to select the inputs for the PWM 421 and the time 422. In another embodiment, multiplexers 423 and 424 are not included in the digital counter, for example, the digital counter 420 may be configured in one, or the other, measurement configuration.

In the frequency measurement method, the relaxation oscillator output signal 356 is counted for a fixed period of time. The counter 422 is read to obtain the number of counts during the gate time. This method works well at low frequencies where the oscillator reset time is small compared to the oscillator period. A pulse width modulator (PWM) 441 is clocked for a fixed period by a derivative of the system clock, VC3 426 (which is a divider from the 24 MHz system clock 425). Pulse width modulation is a modulation technique that generates variable-length pulses to represent the amplitude of an analog input signal; in this case VC3 426. The output of PWM 421 enables timer 422 (e.g., 16-bit). The relaxation oscillator output signal 356 clocks the timer 422. The timer 422 is reset at the start of the sequence, and the count value is read out at the end of the gate period.

In the period measurement method, the relaxation oscillator output signal 356 gates a counter 422, which is clocked by the system clock 425 (e.g., 24 MHz). In order to improve sensitivity and resolution, multiple periods of the oscillator are counted with the PWM 421. The output of PWM 421 is used to gate the timer 422. In this method, the relaxation oscillator output signal 356 drives the clock input of PWM 421. As previously described, pulse width modulation is a modulation technique that generates variable-length pulses to represent the amplitude of an analog input signal; in this case the relaxation oscillator output signal 356. The output of the PWM 421 enables a timer 422 (e.g., 16-bit), which is clocked at the system clock frequency 425 (e.g., 24 MHz). When the output of PWM 421 is asserted (e.g., goes high), the count starts by releasing the capture control. When the terminal count of the PWM 421 is reached, the capture signal is asserted (e.g., goes high), stopping the count and setting the PWM's interrupt. The timer value is read in this interrupt. The relaxation oscillator 350 is indexed to the next switch (e.g., capacitor 351(2)) to be measured and the count sequence is started again.

The two counting methods may have equivalent performance in sensitivity and signal-to-noise ratio (SNR). The period measurement method may have a slightly faster data acquisition rate, but this rate is dependent on software load and the values of the switch capacitances. The frequency measurement method has a fixed-switch data acquisition rate.

The length of the counter 422 and the detection time required for the switch are determined by sensitivity requirements. Small changes in the capacitance on capacitor 351 result in small changes in frequency. In order to find these small changes, it may be necessary to count for a considerable time.

At startup (or boot) the switches (e.g., capacitors 351(1)-(N)) are scanned and the count values for each switch with no actuation are stored as a baseline array (Cp). The presence of a finger on the switch is determined by the difference in counts between a stored value for no switch actuation and the acquired value with switch actuation, referred to here as Δn. The sensitivity of a single switch is approximately:

$$\frac{\Delta n}{n} = \frac{Cf}{Cp} \quad (4)$$

The value of Δn should be large enough for reasonable resolution and clear indication of switch actuation. This drives switch construction decisions.

Cf should be as large a fraction of Cp as possible. In one exemplary embodiment, the fraction of Cf/Cp ranges between approximately 0.01 to approximately 2.0. Alternatively, other fractions may be used for Cf/Cp. Since Cf is determined by finger area and distance from the finger to the switch's conductive traces (through the over-lying insulator), the baseline capacitance Cp should be minimized. The baseline capacitance Cp includes the capacitance of the switch pad plus any parasitics, including routing and chip pin capacitance.

In switch array applications, variations in sensitivity should be minimized. If there are large differences in Δn, one switch may actuate at 1.0 cm, while another may not actuate until direct contact. This presents a non-ideal user interface device. There are numerous methods for balancing the sensitivity. These may include precisely matching on-board capacitance with PC trace length modification, adding balance capacitors on each switch's PC board trace, and/or adapting a calibration factor to each switch to be applied each time the switch is tested.

In one embodiment, the PCB design may be adapted to minimize capacitance, including thicker PCBs where possible. In one exemplary embodiment, a 0.062 inch thick PCB is used. Alternatively, other thicknesses may be used, for example, a 0.015 inch thick PCB.

It should be noted that the count window should be long enough for Δn to be a "significant number." In one embodiment, the "significant number" can be as little as 10, or alternatively, as much as several hundred. In one exemplary embodiment, where Cf is 1.0% of Cp (a typical "weak" switch), and where the switch threshold is set at a count value of 20, n is found to be:

$$n = \Delta n \cdot \frac{Cf}{Cp} = 2000 \quad (5)$$

Adding some margin to yield 2500 counts, and running the frequency measurement method at 1.0 MHz, the detection time for the switch may be 2.5 microseconds. In the frequency measurement method, the frequency difference between a switch with and without actuation (i.e., CP+CF vs. CP) is approximately:

$$\Delta n = \frac{t_{count} \cdot i_c}{V_{TH}} \frac{Cf}{Cp^2} \quad (6)$$

This shows that the sensitivity variation between one channel and another is a function of the square of the difference in the two channels' static capacitances. This sensitivity difference can be compensated using routines in the high-level Application Programming Interfaces (APIs).

In the period measurement method, the count difference between a switch with and without actuation (i.e., CP+CF vs. CP) is approximately:

$$\Delta n = N_{Periods} \cdot \frac{Cf \cdot V_{TH}}{i_C} \cdot f_{SysClk} \quad (7)$$

The charge currents are typically lower and the period is longer to increase sensitivity, or the number of periods for which $f_{SysClk}$ is counted can be increased. In either method, by matching the static (parasitic) capacitances Cp of the individual switches, the repeatability of detection increases, making all switches work at the same difference. Compensation for this variation can be done in software at runtime. The compensation algorithms for both the frequency method and period method may be included in the high-level APIs.

Some implementations of this circuit use a current source programmed by a fixed-resistor value. If the range of capacitance to be measured changes, external components, (i.e., the resistor) should be adjusted.

Using the multiplexer array 430, multiple sensor elements may be sequentially scanned to provide current to and measure the capacitance from the capacitors (e.g., sensor elements), as previously described. In other words, while one sensor element is being measured, the remaining sensor elements are grounded using the GPIO port 207. This drive and multiplex arrangement bypasses the existing GPIO to connect the selected pin to an internal analog multiplexer (mux) bus. The capacitor charging current (e.g., current source 352) and reset switch 353 are connected to the analog mux bus. This may limit the pin-count requirement to simply the number of switches (e.g., capacitors 351(1)-351(N)) to be addressed. In one exemplary embodiment, no external resistors or capacitors are required inside or outside the processing device 210 to enable operation.

The capacitor charging current for the relaxation oscillator 350 is generated in a register programmable current output DAC (also known as IDAC). Accordingly, the current source 352 is a current DAC or IDAC. The IDAC output current may be set by an 8-bit value provided by the processing device 210, such as from the processing core 202. The 8-bit value may be stored in a register or in memory.

Estimating and measuring PCB capacitances may be difficult; the oscillator-reset time may add to the oscillator period (especially at higher frequencies); and there may be some variation to the magnitude of the IDAC output current with operating frequency. Accordingly, the optimum oscillation frequency and operating current for a particular switch array may be determined to some degree by experimentation.

In many capacitive switch designs the two "plates" (e.g., 301 and 302) of the sensing capacitor are actually adjacent PCB pads or traces, as indicated in FIG. 3A. Typically, one of these plates is grounded. The layout for touch-sensor slider (e.g., linear slide switches) may include switches that are immediately adjacent. In this case, all of the switches that are not active are grounded through the GPIO 207 of the processing device 210 dedicated to that pin. The actual capacitance between adjacent plates is small (Cp), but the capacitance of the active plate (and its PCB trace back to the processing device 210) to ground, when detecting the presence of the conductive object 303, may be considerably higher (Cp+Cf). The capacitance of two parallel plates is given by the following equation:

$$C = \varepsilon_0 \cdot \varepsilon_R \cdot \frac{A}{d} = \varepsilon_R \cdot 8.85 \cdot \frac{A}{d} \text{ pF/m} \qquad (8)$$

The dimensions of equation (8) are in meters. This is a very simple model of the capacitance. The reality is that there are fringing effects that substantially increase the switch-to-ground (and PCB trace-to-ground) capacitance.

Switch sensitivity (i.e., actuation distance) may be increased by one or more of the following: 1) increasing board thickness to increase the distance between the active switch and any parasitics; 2) minimizing PC trace routing underneath switches; 3) utilizing a grided ground with 50% or less fill if use of a ground plane is absolutely necessary; 4) increasing the spacing between switch pads and any adjacent ground plane; 5) increasing pad area; 6) decreasing thickness of any insulating overlay; or 7) verifying that there is no air-gap between the PC pad surface and the touching finger.

There is some variation of switch sensitivity as a result of environmental factors. A baseline update routine, which compensates for this variation, may be provided in the high-level APIs.

Sliding switches are used for control requiring gradual adjustments. Examples include a lighting control (dimmer), volume control, graphic equalizer, and speed control. These switches are mechanically adjacent to one another. Actuation of one switch results in partial actuation of physically adjacent switches. The actual position in the sliding switch is found by computing the centroid location of the set of switches activated.

In applications for touch-sensor sliders (e.g., sliding switches), it is often necessary to determine finger (or other capacitive object) position to more resolution than the native pitch of the individual switches. The contact area of a finger on a sliding switch is often larger than any single switch. In one embodiment, in order to calculate the interpolated position using a centroid, the array is first scanned to verify that a given switch location is valid. The requirement is for some number of adjacent switch signals to be above a noise threshold. When the strongest signal is found, this signal and those immediately adjacent are used to compute a centroid:

$$\text{Centroid} = \frac{n_{i-1} \cdot (i-1) + n_i i + n_{i+1} \cdot (i+1)}{n_{i-1} + n_i i + n_{i+1}}, \qquad (9)$$

The calculated value will almost certainly be fractional. In order to report the centroid to a specific resolution, for example a range of 0 to 100 for 12 switches, the centroid value may be multiplied by a calculated scalar. It may be more efficient to combine the interpolation and scaling operations into a single calculation and report this result directly in the desired scale. This may be handled in the high-level APIs. Alternatively, other methods may be used to interpolate the position of the conductive object.

A physical touchpad assembly is a multi-layered module to detect a conductive object. In one embodiment, the multi-layer stack-up of a touchpad assembly includes a PCB, an adhesive layer, and an overlay. The PCB includes the processing device 210 and other components, such as the connector to the host 250, necessary for operations for sensing the capacitance. These components are on the non-sensing side of the PCB. The PCB also includes the sensor array on the opposite side, the sensing side of the PCB. Alternatively, other multi-layer stack-ups may be used in the touchpad assembly.

The PCB may be made of standard materials, such as FR4 or Kapton™ (e.g., flexible PCB). In either case, the processing device 210 may be attached (e.g., soldered) directly to the sensing PCB (e.g., attached to the non-sensing side of the PCB). The PCB thickness varies depending on multiple variables, including height restrictions and sensitivity requirements. In one embodiment, the PCB thickness is at least approximately 0.3 millimeters (mm). Alternatively, the PCB may have other thicknesses. It should be noted that thicker PCBs may yield better results. The PCB length and width is dependent on individual design requirements for the device on which the sensing device is mounted, such as a notebook or mobile handset.

The adhesive layer is directly on top of the PCB sensing array and is used to affix the overlay to the overall touchpad assembly. Typical material used for connecting the overlay to the PCB is non-conductive adhesive such as 3M 467 or 468. In one exemplary embodiment, the adhesive thickness is approximately 0.05 mm. Alternatively, other thicknesses may be used.

The overlay may be non-conductive material used to protect the PCB circuitry to environmental elements and to insulate the user's finger (e.g., conductive object) from the circuitry. Overlay can be ABS plastic, polycarbonate, glass, or Mylar™. Alternatively, other materials known by those of ordinary skill in the art may be used. In one exemplary embodiment, the overlay has a thickness of approximately 1.0 mm. In another exemplary embodiment, the overlay thickness has a thickness of approximately 2.0 mm. Alternatively, other thicknesses may be used.

The sensor array may be a grid-like pattern of sensor elements (e.g., capacitive elements) used in conjunction with the processing device 210 to detect a presence of a conductive object, such as finger, to a resolution greater than that which is native. The touch-sensor pad layout pattern maximizes the area covered by conductive material, such as copper, in relation to spaces necessary to define the rows and columns of the sensor array.

Figure 5A:
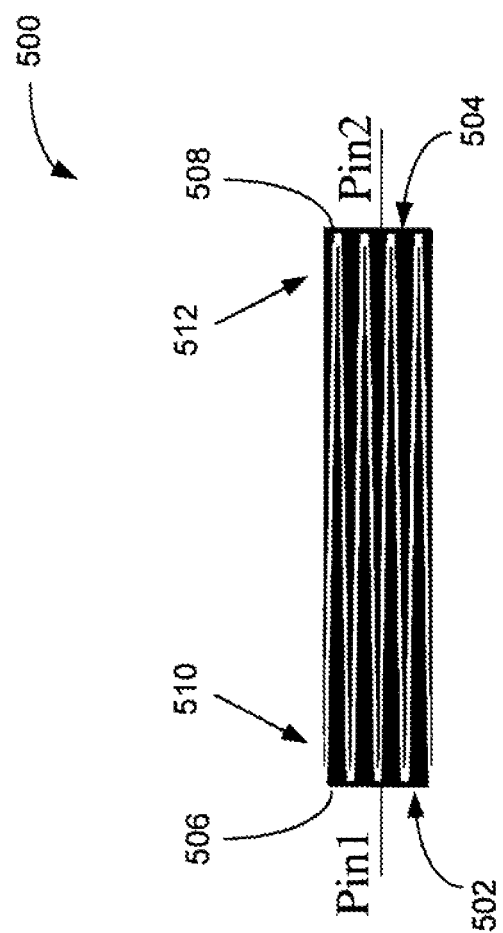
FIG. 5A illustrates a top view of a slider structure in accordance with one embodiment.

FIG. 5A illustrates one embodiment of a slider 500. The slider 500 includes a first conductive trace 502 and a second conductive trace 504. The first conductive trace 502 may have at least one sub-trace. FIG. 5A illustrates an embodiment where the first conductive trace 502 has four sub-traces 506. The second conductive trace 504 has at least one sub-trace. FIG. 5A illustrates an embodiment where the second conductive trace 504 has five sub-traces 508. The sub-traces 506 of the first conductive trace 502 may be interleaved with the sub-traces 508 of the second conductive trace 504. The sub-traces 506, and 508 may form a toothed pattern.

Each sub-trace 506, 508 may have a variable width from a first end 510 to a second end 512 of the slider 500. In accordance with one embodiment, the width of each sub-trace 506 of the first conductive trace 502 may gradually decrease from the first end 510 to the second end 512. The width of each sub-trace 508 of the second conductive trace 504 may gradually increase from the first end 510 to the second end 512. In order words, the width of each sub-trace may be tapered from one end to the other.

FIG. 5A illustrates an example of the sub-traces 506, 508 each having a triangle shape. The sub-traces 506 of the first conductive trace 502 are alternated with the sub-traces 508 of the second conductive trace 504. The sub-traces 506 are adjacent to the sub-traces 508 at the first end 510 and the second end 512 of the slider 500.

In accordance with one embodiment, the first and second conductive traces are disposed in the same plane. Alternatively, the first and second conductive traces 502, 504 may be disposed respectively on different planes. The different planes may and may not be substantially parallel to one another.

Each conductive trace is capacitive sensing pin of a processing device. Because the slider 500 illustrated in FIG. 5A has only two conductive traces 502, 504, the slider 500 may need only two capacitive sensing pins connected.

Figure 5B:
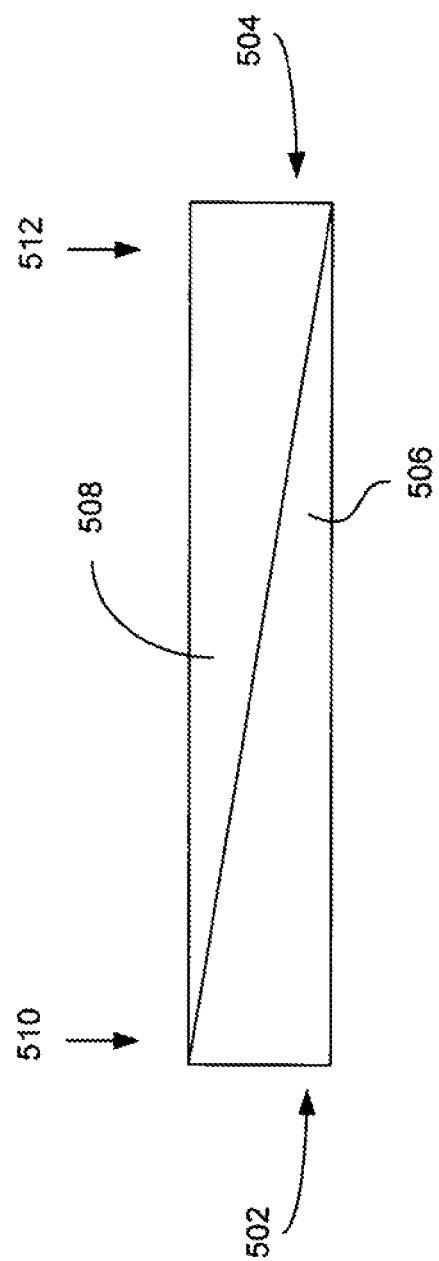
FIG. 5B illustrates a top view of a slider structure in accordance with another embodiment.

FIG. 5B illustrates another embodiment of the slider 500. The slider 500 includes a first conductive trace 502 and a second conductive trace 504. FIG. 5B illustrates an embodiment where the first conductive trace 502 includes one sub-trace 506 and the second conductive trace 504 includes one sub-trace 508. The sub-trace 506 of the first conductive trace 502 may be interleaved with the sub-trace 508 of the second conductive trace 504. The width of the sub-trace 506 may gradually decrease from the first end 510 to the second end 512. The width of the sub-trace 508 may gradually increase from the first end 510 to the second end 512. In FIG. 5B, both sub-traces 506 and 508 together form a rectangular pattern. FIG. 5B illustrates a slider with the lowest resolution possible. Those of ordinary skills in the art will recognize that higher resolution is achieved with a higher number of sub-traces.

Figure 6:
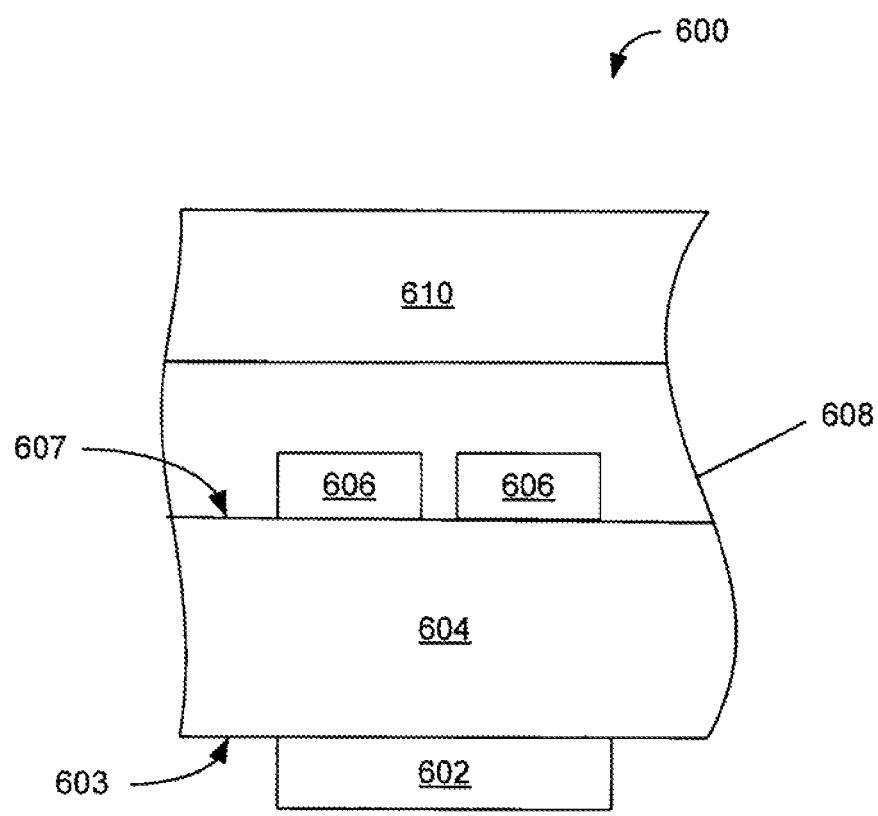
FIG. 6 illustrates a cross-sectional view of the slider structure of FIGS. 5A and 5B.

FIG. 6 illustrates a cross-sectional view of the slider 500. The assembly of the slider 500 may include a multi-layered module 600 that maximizes the ability to detect a conductive object. The multi-layered module 600 may include a processing device 602. Those of ordinary skills in the art will recognize that there are many types of processing devices. For example, the processing device 602 may be a programmable system on chip (PSoC®) manufactured by Cypress Semiconductor. The processing device 602 may include components (not shown) necessary for capacitive variation sensing operation on the non-sensing side 603 of a printed circuit board (PCB) 604. A sensing array 606 is formed on the sensing side 607 of the PCB 604 opposite to the non-sensing side 603.

In accordance with one embodiment, the PCB 604 may be made of a flexible PCB. Components may be attached (for example, soldered) directly to the PCB 604 on the non-sensing side 603. The thickness of the PCB 604 may vary depending on height restrictions and sensitivity requirements. For example, a minimum thickness of the PCB 604 may be 0.3 mm. A maximum thickness may not be defined as thicker PCBs yield better results. The length and width of the PCB 604 may be dependent on various design requirements.

An adhesive layer 608 may be formed directly on top of the sensing array 606 of the PCB 604. The adhesive layer 608 may be used to affix an overlay 610 to the overall touchpad assembly. For example, a typical material used for connecting the overlay 610 to the PCB 604 may include a non-conductive adhesive. In accordance with one embodiment, the thickness of the adhesive layer 608 may be approximately 0.05 mm. Alternatively, other thicknesses may be used.

The overlay 610 may include a non-conductive material used to protect the touchpad circuitry from environmental elements and to insulate a user's finger from the touchpad circuitry. For example, the overlay may be made of ABS plastic, polycarbonate, glass, or Mylar™. The thickness of the overlay 610 may be variable. In accordance with one embodiment, a maximum thickness of the overlay 610 may be 2.0 mm, and a typical thickness of the overlay 610 may be less than 1.0 mm. Alternatively, other thicknesses may be used.

Figure 1:
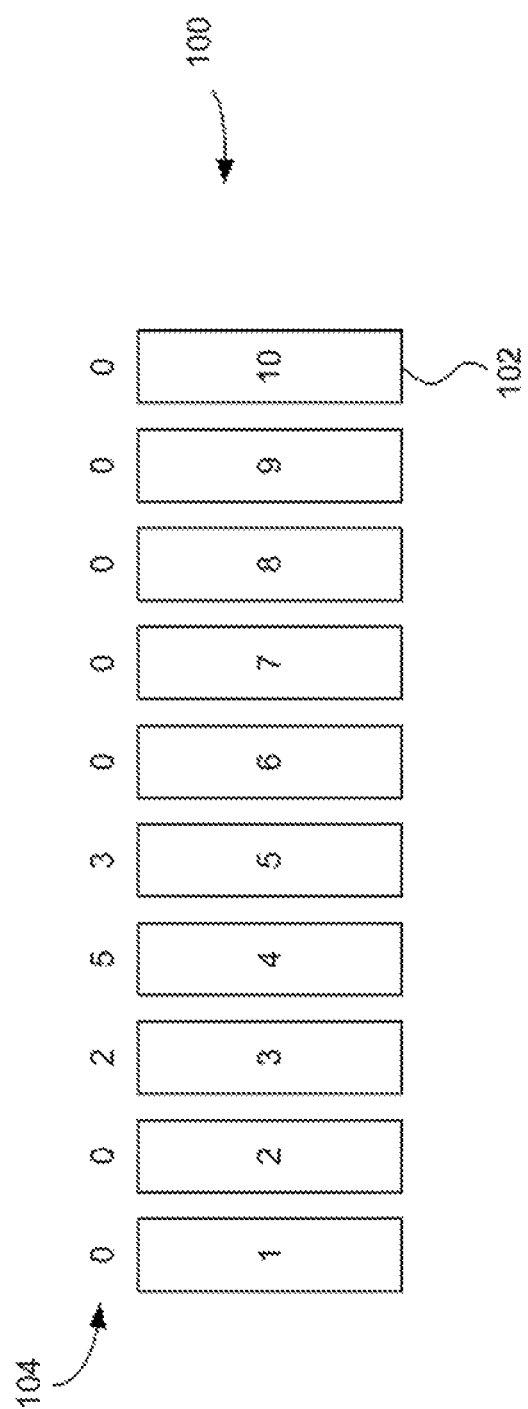
FIG. 1 is a top view illustrating an example of a conventional slider structure.

The sensing array 606 on the sensing side 607 of the PCB 604 may include a physical pattern of capacitive elements used in conjunction with the processing device 602 to detect the position of a conductive object, such as finger. FIGS. 5A and 5B illustrate an example of a pattern of interleaved conductive traces 502, 504 made of a conductive material, such as, for example, copper. This physical pattern of capacitive elements reduces the number of contact pins needed for the module 600. Instead of requiring ten pins as illustrated in FIG. 1, only two pins may be used for the slider 500.

In accordance with one embodiment, the interleaved conductive traces may have a thickness ranging from about 0.1 mm to about 6.0 mm. In accordance with one embodiment, the maximum thickness of each conductive trace may range from about 0.035 mm to about 0.2275 mm. Alternatively, other thicknesses may be used.

Figure 7:
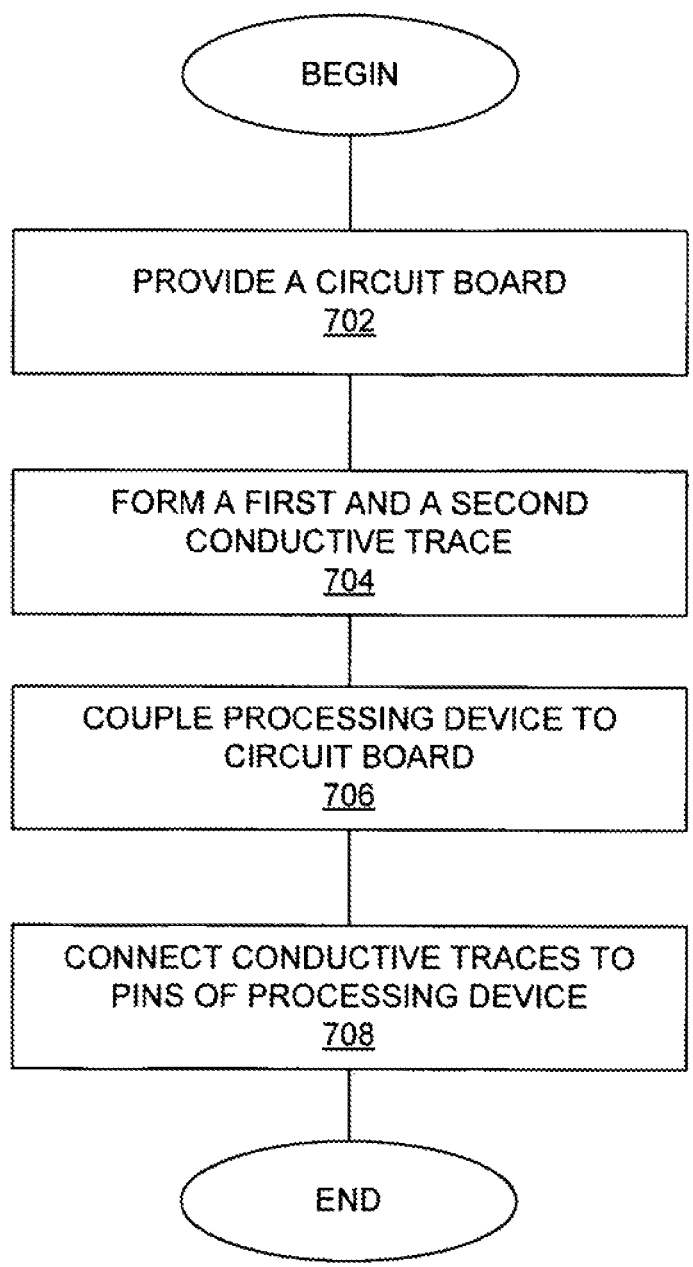
FIG. 7 illustrates a flow diagram of a method for manufacturing the slider structure of FIG. 5.

FIG. 7 illustrates a flow diagram of a method for manufacturing the slider structure of FIGS. 5A, 5B. At 702 a circuit board having a first side and a second side is provided. At 704, a first conductive trace and second conductive trace of the slider are formed on the first side of the circuit board. The first and second conductive traces each have at least one sub-trace. The sub-traces of the first conductive trace are interleaved with the sub-traces of the second conductive trace. Each sub-trace of the first and second conductive traces has a variable width from a first end to a second end of the slider.

At 706, a processing device is coupled to the second side of the circuit board. At 708, the first conductive trace is connected to a first capacitive sensing pin of the processing device. The second conductive trace is connected to a second capacitive sensing pin of the processing device.

Figure 8:
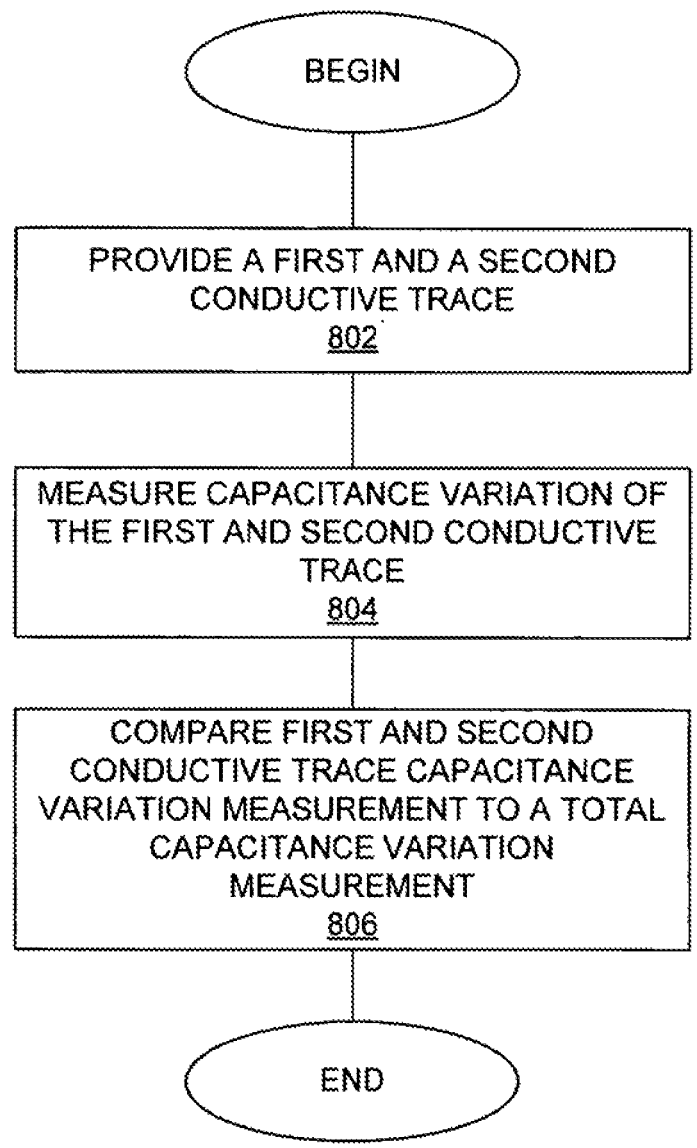
FIG. 8 illustrates a flow diagram of a method for operating the slider structure of FIG. 5.

FIG. 8 illustrates a flow diagram of a method for operating the slider structure of FIGS. 5A, 5B. At 802, a first conductive trace and a second conductive trace of the slider are provided. The first and second conductive traces each have at least one sub-trace. The sub-traces of the first conductive trace are interleaved with the sub-traces of the second conductive trace. Each sub-trace of the first and second conductive traces has a variable width from a first end to a second end of the slider.

At 804, the capacitance variation of the first conductive trace, d1, and the capacitance variation of the second conductive trace, d2, is measured. If both d1 and d2 have a value substantially close to zero, no finger or stylus may be detected. Otherwise, at 806, the one-dimensional position on the slider (i.e., the Centroid position) is computed by comparing the capacitance variation of the first conductive trace or the second conductive trace to the total capacitance variation of both first and second conductive traces multiplied by the resolution:

$$P_{cen} = d2/(d1+d2) \times N_{res}$$

where, Nres is an arbitrary resolution (or the number of sub-traces).

An advantage of the present toothed slider structure is the reduced number of pins used in the structure. As a result, the total scan time of each pin is reduced. The resolution or the total number of sub-trace may bet set arbitrarily.

Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. An apparatus comprising:
a first conductive element of a capacitive touch sensor having at least one conductive sub-element;
a second conductive element of the capacitive touch sensor having at least one conductive sub-element,
the at least one conductive sub-element of the first conductive element interleaved with the at least one conductive sub-element of the second conductive element, the at least one conductive sub-element of the first conductive element and the at least one conductive sub-element of the second conductive element each having a varying width from a first end of the capacitive touch sensor to a second end of the capacitive touch sensor; and
a processing device coupled with the capacitive touch sensor, the processing device configured to calculate a centroid position of a conductive object through a capacitance variation of the first conductive element and a capacitance variation of the second conductive element, wherein the calculation of the centroid position includes comparing the capacitance variation of the first conductive element with a sum of the capacitance variation of the first conductive element and the capacitance variation of the second conductive element.

2. The apparatus of claim 1, wherein the width of the at least one conductive sub-element of the first conductive element gradually decreases from the first end of the capacitive touch sensor to the second end of the capacitive touch sensor, and the width of the at least one conductive sub-element of the second conductive element gradually increases from the first end of the capacitive touch sensor to the second end of the capacitive touch sensor.

3. The apparatus of claim 1, wherein the at least one conductive sub-element of the first conductive element and the at least one conductive sub-element of the second conductive element are in a shape of a triangle.

4. The apparatus of claim 1, wherein the first conductive element includes a first plurality of conductive sub-elements and the second conductive element includes a second plurality of conductive sub-elements, wherein the first plurality of conductive sub-elements are alternated with the second plurality of conductive sub-elements.

5. The apparatus of claim 1, wherein a first end of the at least one conductive sub-element of the first conductive element is adjacent to a first end of the at least one conductive sub-element of the second conductive element.

6. The apparatus of claim 1, wherein the first conductive element and the second conductive element are in a same plane.

7. The apparatus of claim 1, wherein the centroid position is $P_{cen}$, with $P_{cen} = d2/(d1+d2) \times N_{res}$, wherein d1 is the capacitance variation of the first conductive element, d2 is the capacitance variation of the second conductive element, and $N_{res}$ is a resolution of the capacitive touch sensor.

8. The apparatus of claim 1, comprising a substrate having a first side and a second side, wherein the first conductive element and the second conductive element are formed on the first side of the substrate, and the processing device is coupled to the second side of the substrate.

9. The apparatus of claim 8, wherein the first conductive element is coupled to a first capacitive sensing pin of the processing device, and the second conductive element is coupled to a second capacitive sensing pin of the processing device.

10. The apparatus of claim 8, wherein the first conductive element and the second conductive element form a single layer on the first side of the substrate.

11. A method comprising:
measuring a capacitance variation of a first conductive element, the first conductive element including at least one conductive sub-element;
measuring a capacitance variation of a second conductive element, the second conductive element including at least one conductive sub-element,
the at least one conductive sub-element of the first conductive element interleaved with the at least one conductive sub-element of the second conductive element, the at least one conductive sub-element of the first conductive element and the at least one conductive sub-element of the second conductive element each having a varying width; and
calculating a position of a conductive object through the measured capacitance variation of the first conductive element and the measured capacitance variation of the second conductive element, wherein the calculating of the position includes comparing the measured capacitance variation of the first conductive element with a sum of the measured capacitance variation of the first conductive element and the measured capacitance variation of the second conductive element.

12. The method of claim 11, wherein the calculating of the position includes calculating $P_{cen}$, with $P_{cen}=d2/(d1+d2)\times N_{res}$, wherein d1 is the capacitance variation of the first conductive element, d2 is the capacitance variation of the second conductive element, and $N_{res}$ is a resolution of a capacitive touch sensor including the first conductive element and the second conductive element.

13. The method of claim 11, wherein the measured capacitance variation of the first conductive element depends on the width of the at least one conductive sub-element of the first conductive element, wherein the width of the at least one conductive sub-element of the first conductive element gradually decreases from a first end of the first conductive element to a second end of the first conductive element.

14. The method of claim 13, wherein the measured capacitance variation of the second conductive element depends on the width of the at least one conductive sub-element of the second conductive element, wherein the width of the at least one conductive sub-element of the second conductive element gradually increases from a first end of the second conductive element to a second end of the second conductive element.

15. A system comprising:
a capacitive touch sensor including:
    a first conductive element having at least one conductive sub-element; and
    a second conductive element having at least one conductive sub-element, the at least one conductive sub-element of the first conductive element interleaved with the at least one conductive sub-element of the second conductive element, the at least one conductive sub-element of the first conductive element and the at least one conductive sub-element of the second conductive element each having a varying width from a first end of the capacitive touch sensor to a second end of the capacitive touch sensor; and
a capacitance sensor coupled with the capacitive touch sensor, the capacitance sensor configured to measure a capacitance variation of the first conductive element and measure a capacitance variation of the second conductive element; and
a processing device coupled with the capacitive touch sensor, the processing device configured to calculate a centroid position of a conductive object through the capacitance variation of the first conductive element and the capacitance variation of the second conductive element, wherein the calculation of the centroid position includes comparing the capacitance variation of the first conductive element with a sum of the capacitance variation of the first conductive element and the capacitance variation of the second conductive element.

16. The system of claim 15, further comprising a communication interface configured to communicate the centroid position with a host, the host configured to use the centroid position in at least one of an adjustment operation, a scrolling operation, and a gesture operation.

17. The system of claim 15, wherein the capacitance sensor includes a relaxation oscillator coupled with the first conductive element and the second conductive element through one or more analog signal interface, the relaxation oscillator configured to measure the capacitance variation of the first conductive element and measure the capacitance variation of the second conductive element.

18. The system of claim 15, wherein the capacitive touch sensor includes a touch sensor slider, wherein each of the first conductive element and the second conductive element comprise a switch of the touch sensor slider.

* * * * *